(12) United States Patent
Fujimori et al.

(10) Patent No.: US 12,480,230 B2
(45) Date of Patent: Nov. 25, 2025

(54) CARBON NANOTUBE-RESIN COMPOSITE AND METHOD FOR MANUFACTURING CARBON NANOTUBE-RESIN COMPOSITE

(71) Applicants: SUMITOMO ELECTRIC INDUSTRIES, LTD., Osaka (JP); UNIVERSITY OF TSUKUBA, Tsukuba (JP)

(72) Inventors: Toshihiko Fujimori, Osaka (JP); Takeshi Hikata, Osaka (JP); Soichiro Okubo, Osaka (JP); Jun-Ichi Fujita, Tsukuba (JP)

(73) Assignees: SUMITOMO ELECTRIC INDUSTRIES, LTD., Osaka (JP); UNIVERSITY OF TSUKUBA, Tsukuba (JP)

( * ) Notice: Subject to any disclaimer, the term of this patent is extended or adjusted under 35 U.S.C. 154(b) by 533 days.

(21) Appl. No.: 17/639,462

(22) PCT Filed: Aug. 28, 2020

(86) PCT No.: PCT/JP2020/032596
§ 371 (c)(1),
(2) Date: Mar. 1, 2022

(87) PCT Pub. No.: WO2021/044963
PCT Pub. Date: Mar. 11, 2021

(65) Prior Publication Data
US 2022/0341065 A1 Oct. 27, 2022

(30) Foreign Application Priority Data
Sep. 3, 2019 (JP) .................... 2019-160767

(51) Int. Cl.
*D01F 9/127* (2006.01)
*C01B 32/16* (2017.01)
*D02G 3/40* (2006.01)

(52) U.S. Cl.
CPC ............ *D01F 9/1272* (2013.01); *C01B 32/16* (2017.08); *D02G 3/404* (2013.01); *C01P 2002/82* (2013.01); *D10B 2101/122* (2013.01)

(58) Field of Classification Search
CPC ....... D01F 9/1272; D01F 9/127; C01B 32/16; C01B 32/164; D02G 3/404;
(Continued)

(56) References Cited

U.S. PATENT DOCUMENTS

2002/0102196 A1* 8/2002 Smalley ............... B82B 3/00
422/600
2005/0074569 A1* 4/2005 Lobovsky ............. D01F 8/04
428/36.9
(Continued)

FOREIGN PATENT DOCUMENTS

CN 101723350 7 6/2010
CN 103298738 A 9/2013
(Continued)

OTHER PUBLICATIONS

Lekawa-Raus et al.; "Electrical Properties of Carbon Nanotube Based Fibers and Their Future Use in Electrical Wiring;" Advanced Functional Materials; 2014; pp. 3661-3682; vol. 24.
(Continued)

*Primary Examiner* — Jennifer A Gillett
(74) *Attorney, Agent, or Firm* — Oliff PLC

(57) ABSTRACT

A carbon nanotube-resin composite includes: a carbon nanotube assembled wire including a plurality of carbon nanotubes; and a resin, wherein in the carbon nanotube
(Continued)

assembled wire, the carbon nanotubes are oriented at a degree of orientation of 0.9 or more and 1 or less.

8 Claims, 3 Drawing Sheets

(58) Field of Classification Search
CPC . C01P 2002/82; D10B 2101/122; H01B 1/24; C08K 7/06; C08L 101/00
See application file for complete search history.

(56) References Cited

U.S. PATENT DOCUMENTS

| | | | |
|---|---|---|---|
| 2007/0224107 | A1 | 9/2007 | Hikata |
| 2008/0145570 | A1 | 6/2008 | Zhang et al. |
| 2011/0024409 | A1* | 2/2011 | Shah .................. C04B 20/1055 428/323 |
| 2011/0217451 | A1* | 9/2011 | Veerasamy ............ C09D 11/52 977/890 |
| 2012/0000691 | A1* | 1/2012 | Shah ..................... B82Y 30/00 977/932 |
| 2013/0309473 | A1* | 11/2013 | Sundaram ............... D01F 9/133 428/338 |
| 2013/0337707 | A1* | 12/2013 | Hata ..................... C01B 32/174 423/447.2 |
| 2015/0025191 | A1* | 1/2015 | Naito ..................... D04H 3/002 428/367 |
| 2017/0313043 | A1 | 11/2017 | Fujimura et al. |
| 2020/0010633 | A1 | 1/2020 | Aoki et al. |

FOREIGN PATENT DOCUMENTS

| | | |
|---|---|---|
| CN | 104192818 A | 12/2014 |
| EP | 2 383 225 A1 | 11/2011 |
| JP | 2005-330175 A | 12/2005 |
| JP | 2006-527786 A | 12/2006 |
| JP | 2008-045124 A | 2/2008 |
| JP | 2008-523254 5 | 7/2008 |
| JP | 2014-517797 A | 7/2014 |
| JP | 2015-93807 8 | 5/2015 |
| JP | 2016-141778 A | 8/2016 |
| JP | 2017-106129 A | 6/2017 |
| JP | 2018-150635 A | 9/2018 |
| JP | 2019-093646 A | 6/2019 |
| JP | 2020-164382 | 10/2020 |
| WO | 2005/028174 A2 | 3/2005 |
| WO | 2007/015710 6 | 2/2007 |
| WO | 2012/059716 A1 | 5/2012 |
| WO | 2012/118836 A1 | 9/2012 |
| WO | 2014/084042 A1 | 6/2014 |
| WO | 2016/067330 A1 | 5/2016 |
| WO | 2018/173716 A1 | 9/2018 |

OTHER PUBLICATIONS

Shibata et al., "Electric conduction characteristics of aligned ling-CNT resin composites," Abstract of the 75th JSAP Autumn Meeting, p. 17-141, Sep. 17, 2014.
Sep. 10, 2024 Office Action issued in Japanese Patent Application No. 2021-543735.
Shibata et al., "Electric conduction characteristics of aligned ling-CNT resin composites," Abstract of the 75th JSAP Autumn Meeting, p. 17-141, Sep. 17, 2024.
Mikhalchan et al., "Aligned carbon nanotube-epoxy composites: the effect of nanotube organization on strength, stiffness and toughness," Journal of Material Science, pp. 10005-10025, Aug. 9, 2016.

* cited by examiner

CARBON NANOTUBE-RESIN COMPOSITE AND METHOD FOR MANUFACTURING CARBON NANOTUBE-RESIN COMPOSITE

TECHNICAL FIELD

The present disclosure relates to a carbon nanotube-resin composite and a method for manufacturing the carbon nanotube-resin composite. The present application claims a priority based on Japanese Patent Application No. 2019-160767 filed on Sep. 3, 2019, the entire content of which is incorporated herein by reference.

BACKGROUND ART

A carbon nanotube (hereinafter also referred to as "CNT") composed of a cylindrical graphene sheet made of carbon atoms bonded in a hexagonal pattern is a material having excellent characteristics, such as a weight that is one fifth of that of copper, a strength that is 20 times that of steel, and a metal-like electrical conductivity. Thus, an electric wire using the carbon nanotube is expected as a material contributing to decreased weight and size and improved corrosion resistance of motors for cars in particular.

The carbon nanotube is obtained, for example, through vapor deposition by supplying a carbon-containing source gas while heating a fine catalyst such as iron to grow the carbon nanotube from the catalyst, as described in PTL 1 (Japanese Patent Laid-Open No. 2005-330175).

CITATION LIST

Patent Literature

PTL 1: Japanese Patent Laid-Open No. 2005-330175

Non Patent Literature

NPL 1: Agnieszka Lekawa-Raus et al. "Electrical Properties of Carbon Nanotube Based Fibers and Their Future Use in Electrical Wiring", Advanced Functional Materials, Vo. 24, p.p. 3661-3682 (2014). DOI: 10.1002/adfm.201303716

SUMMARY OF INVENTION

A carbon nanotube-resin composite according to an embodiment of the present disclosure is a carbon nanotube-resin composite including: a carbon nanotube assembled wire including a plurality of carbon nanotubes; and a resin, wherein in the carbon nanotube assembled wire, the carbon nanotubes are oriented at a degree of orientation of 0.9 or more and 1 or less.

A method for manufacturing a carbon nanotube-resin composite according to one embodiment of the present disclosure is a method for manufacturing the above-described carbon nanotube-resin composite, the method including:

growing a plurality of carbon nanotubes by growing one or more carbon nanotubes from each of a plurality of catalyst particles in a suspended state by supplying a carbon-containing gas to the plurality of catalyst particles;

drawing the plurality of carbon nanotubes by applying a tensile force to the plurality of carbon nanotubes in the suspended state;

orienting and assembling the plurality of carbon nanotubes in the suspended state in a direction along a flow of the carbon-containing gas to obtain a plurality of carbon nanotube assembled wires;

adhering a volatile liquid including a resin to the plurality of carbon nanotube assembled wires while orienting and bundling the plurality of carbon nanotube assembled wires in a direction along a longitudinal direction of each of the plurality of carbon nanotube assembled wires; and evaporating the volatile liquid adhered to the plurality of carbon nanotube assembled wires to obtain the carbon nanotube-resin composite.

DETAILED DESCRIPTION

Figure 1:
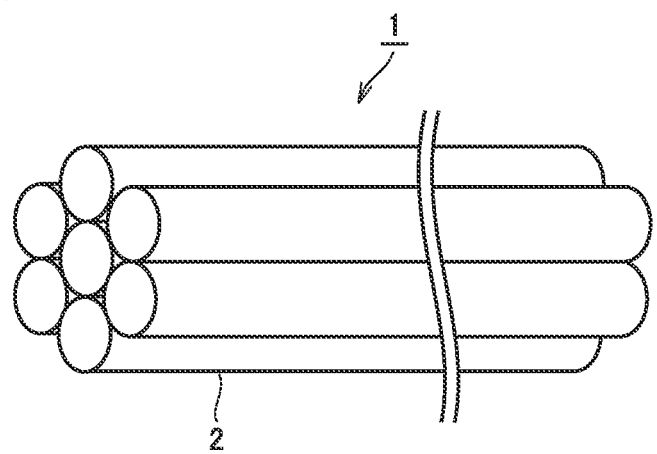
FIG. 1 is a diagram illustrating a representative exemplary configuration of a carbon nanotube assembled wire included in a carbon nanotube-resin composite according to one embodiment of the present disclosure.

Problem to be Solved by the Present Disclosure

Carbon nanotubes obtained with the state of the art of producing carbon nanotubes have a diameter of about 0.4 nm to 20 nm and a maximum length of about 55 cm. In order to use a carbon nanotube as an electric wire, a high strength material and the like, the carbon nanotube needs to be longer, and accordingly, techniques capable of elongating a carbon nanotube have been studied.

As one method for elongating a carbon nanotube, a method for orienting and assembling a plurality of carbon nanotubes together in a longitudinal direction to be an assembled wire may be considered.

As one of such methods, a method has been studied in which a plurality of non-oriented CNTs are mixed with a dispersing agent (a surfactant, a polymer, or the like) and are injection-molded into the form of fiber, thereby obtaining a CNT assembled wire (NPL 1).

However, the breaking strength of the CTN assembled wire obtained by the above method tends to be lower than the breaking strength that the CNT intrinsically has.

Thus, an object of the present disclosure is to provide a carbon nanotube-resin composite having excellent breaking strength.

Advantageous Effect of the Present Disclosure

According to the above embodiment, a carbon nanotube-resin composite having excellent breaking strength can be provided.

Description of Embodiments

First, embodiments of the present disclosure are listed and described.

(1) A carbon nanotube-resin composite of the present disclosure is a carbon nanotube-resin composite including: a carbon nanotube assembled wire including a plurality of carbon nanotubes; and a resin, wherein in the carbon nanotube assembled wire, the carbon nanotubes are oriented at a degree of orientation of 0.9 or more and 1 or less.

According to the above embodiment, a carbon nanotube-resin composite having excellent breaking strength can be provided.

(2) The carbon nanotube-resin composite preferably includes 0.1% by mass or more and less than 100% by mass of the resin.

This leads to further improved breaking strength of the carbon nanotube-resin composite.

(3) The resin is preferably a thermosetting resin or a photo-curable resin.

Since an individual CNT included in the carbon nanotube-resin composite has a small diameter in nanometer level, the carbon nanotube-resin composite can be suitably used, for example, in a CFRP (Carbon Fiber Reinforced Plastics) product that has a large curvature and a complicated shape and that is difficult to be handled with an existing carbon fiber (minimum filament diameter: about several μm).

(4) The thermosetting resin is preferably a novolac type epoxy resin.

This leads to further improved breaking strength of the carbon nanotube-resin composite.

(5) The resin is preferably a thermoplastic resin.

Since an individual CNT included in the carbon nanotube-resin composite has a small diameter in nanometer level, the carbon nanotube-resin composite can be suitably used, for example, in a CFRP (Carbon Fiber Reinforced Plastics) product that has a large curvature and a complicated shape and that is difficult to be handled with an existing carbon fiber (minimum filament diameter: about several μm).

(6) The thermoplastic resin is preferably a polymethylmethacrylate resin.

This leads to further improved breaking strength of the carbon nanotube-resin composite.

(7) In a Raman spectrum of the carbon nanotube-resin composite, a ratio D/G of a peak intensity G at a Raman shift of $1590\pm20$ cm$^{-1}$ and a peak intensity D at a Raman shift of $1350\pm20$ cm$^{-1}$ is preferably 0 or more and 0.1 or less.

This leads to further improved breaking strength of the carbon nanotube-resin composite.

(8) A method for manufacturing a carbon nanotube-resin composite according to one embodiment of the present disclosure is a method for manufacturing the above-described carbon nanotube-resin composite, the method including:

growing a plurality of carbon nanotubes by growing one or more carbon nanotubes from each of a plurality of catalyst particles in a suspended state by supplying a carbon-containing gas to the plurality of catalyst particles;

drawing the plurality of carbon nanotubes by applying a tensile force to the plurality of carbon nanotubes in the suspended state;

orienting and assembling the plurality of carbon nanotubes in the suspended state in a direction along a flow of the carbon-containing gas to obtain a plurality of carbon nanotube assembled wires;

adhering a volatile liquid including a resin to the plurality of carbon nanotube assembled wires while orienting and bundling the plurality of carbon nanotube assembled wires in a direction along a longitudinal direction of each of the plurality of carbon nanotube assembled wires; and evaporating the volatile liquid adhered to the plurality of carbon nanotube assembled wires to obtain the carbon nanotube-resin composite.

Accordingly, a carbon nanotube-resin composite having excellent breaking strength can be obtained.

Details of Embodiments of the Present Invention

A specific example of a carbon nanotube-resin composite (hereinafter, also referred to as "CNT-resin composite") according to one embodiment of the present disclosure will be described below with reference to figures.

It should be noted that the same reference characters indicate the same or equivalent portions in the figures of the present disclosure. Further, a relation of such a dimension as a length, a width, a thickness, or a depth is modified as appropriate for clarity and brevity of the figures and does not necessarily represent an actual dimensional relation.

In the present specification, the expression "A to B" represents a range of lower to upper limits (i.e., A or more and B or less). When no unit is indicated for A and a unit is indicated only for B, the unit of A is the same as the unit of B. Moreover, the expression "the upper limit value of the range is C" means that the upper limit of the range is C or less, and the expression "the lower limit value of the range is D" means that the lower limit of the range is D or more.

First Embodiment: Carbon Nanotube-Resin Composite

A carbon nanotube-resin composite according to one embodiment of the present disclosure is a carbon nanotube-resin composite including: a carbon nanotube assembled wire including a plurality of carbon nanotubes; and a resin, wherein in the carbon nanotube assembled wire, the carbon nanotubes are oriented at a degree of orientation of 0.9 or more and 1 or less.

<Carbon Nanotube Assembled Wire>

FIG. 1 is a diagram illustrating a representative exemplary configuration of a carbon nanotube assembled wire (hereinafter, also referred to as "CNT assembled wire") included in the carbon nanotube-resin composite. As shown in FIG. 1, a carbon nanotube assembled wire 1 includes a plurality of carbon nanotubes 2. In the CNT assembled wire, the plurality of carbon nanotubes 2 are oriented at a degree of orientation of 0.9 or more and 1.0 or less.

(Shape of Carbon Nanotube)

For each of the carbon nanotubes included in the CNT assembled wire, a CNT having a known structure can be used. For example, there can be used: a single-layer carbon nanotube in which only one carbon layer (graphene) forms a cylindrical shape; a two-layer carbon nanotube or a multilayer carbon nanotube in which a plurality of carbon layers are stacked to form a cylindrical shape; or the like.

Figure 2:
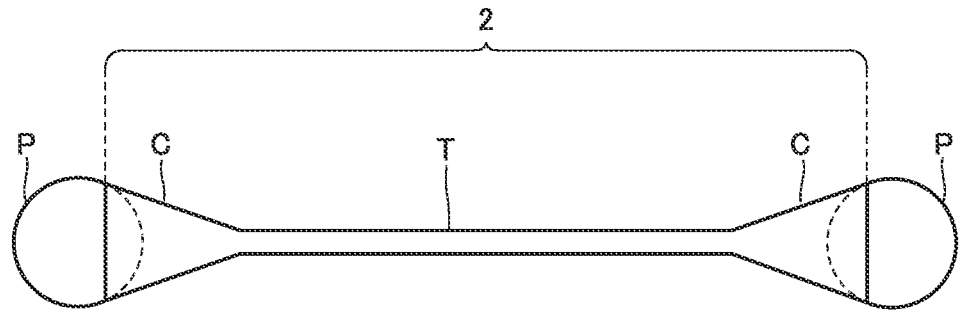
FIG. 2 is a diagram showing an exemplary carbon nanotube included in the carbon nanotube-resin composite according to one embodiment of the present disclosure.

The shape of the carbon nanotube is not particularly limited, and both a carbon nanotube having closed ends and a carbon nanotube having opened ends can be used. Further, as shown in FIG. 2, a catalyst P, which is used in producing the carbon nanotube, may be adhered to one end or both ends of a tube portion T of carbon nanotube 2. In addition, a cone portion C made of a conical graphene may be formed at one end or both ends of tube portion T of carbon nanotube 2.

The length of the carbon nanotube can be selected as appropriate depending on the application. The length of the carbon nanotube is preferably 10 μm or more, and further preferably 100 μm or more, for example. In particular, when the length of the carbon nanotube is 100 μm or more, such a length is suitable from the viewpoint of producing the CNT assembled wire. Although the upper limit value for the length of the carbon nanotube is not particularly limited, it is preferably 600 mm or less from the viewpoint of manufacturing. The length of the CNT is preferably 10 μm or more and 600 mm or less, and further preferably 100 μm or more and 600 mm or less. The length of the CNT can be measured through observation with a scanning electron microscope.

The diameter of the carbon nanotube is preferably 0.6 nm or more and 20 nm or less, is more preferably 1 nm or more and 10 nm or less, and is further preferably 1 nm or more and 2 nm or less. When the diameter of the carbon nanotube is 1 nm or more and 10 nm or less, such a diameter is suitable from the viewpoint of heat resistance under oxidizing conditions. When the diameter of the carbon nanotube is 0.6 nm or more and 2 nm or less, such a diameter is suitable from the viewpoint of improvement in breaking strength.

In the present specification, the diameter of the carbon nanotube means an average outer diameter of one CNT. The CNT's average outer diameter is obtained by directly observing cross sections at two arbitrary positions of the CNT with a transmission electron microscope, measuring, in each cross section, an outer diameter, which is the distance between farthest two points on the outer circumference of the CNT, and calculating an average value of the obtained outer diameters. When the CNT includes the cone portion(s) at one end or both ends thereof, the diameter is measured at a location other than the cone portion(s).

(Degree of Orientation of Carbon Nanotubes)

The following describes a method for calculating a degree of orientation of the CNTs in the CNT assembled wire. In the present specification, the degree of orientation of the CNTs is a value calculated through the following procedure of steps (a1) to (a6).

(a1) Imaging CNT-Resin Composite

The CNT-resin composite is imaged using the following instrument under the following conditions. It should be noted that the CNT-resin composite is sliced in nanometer order using a focused ion beam method (FIB) or a microtome method.

Transmission electron microscope (TEM): "JEM2100" (product name) manufactured by JEOL Ltd.

Conditions: a magnification of 50,000 times to 1.2 million times, and an acceleration voltage of 60 kV to 200 kV It should be noted that as measured by the applicants, as long as the measurement is performed in the same sample, even when results of measurement of the below-described degree of orientation are calculated a plurality of times with locations selected for fields of view for the measurement being changed, it has been confirmed that the measurement results are substantially not varied.

(a2) Binarizing Captured Image

The image captured in the above step (a1) is binarized through the following procedure using the following image processing program.

Image processing program: Non-destructive paper surface fiber orientation analysis program "FiberOri8single03" (www.enomae.com/FiberOri/index.htm)
Processing Procedure:
1. Histogram Average Brightness Correction
2. Background Removal
3. Binarization by Single Threshold
4. Brightness Inversion.

(a3) Fourier Transform of Binarized Image

The image obtained in the above step (a2) is subjected to Fourier transform using the same image processing program as described above (i.e., Non-destructive paper surface fiber orientation analysis program "FiberOri8single03" (www.enomae.com/FiberOri/index.htm).

(a4) Calculating Angle of Orientation and Intensity of Orientation

In the Fourier-transformed image, with the X-axis having a positive direction represented as 0°, an average amplitude with respect to counterclockwise angle (0°) is calculated.

From the Fourier transformed image, a graph is created which shows a relationship between the angle of orientation and the intensity of orientation.

(a5) Measuring Half Width Based on the graph, a full width at half maximum (FWHM) is measured.

(a6) Calculating Degree of Orientation

Based on the full width at half maximum, the degree of orientation is calculated using the following equation (1).

$$\text{Degree of orientation} = (180° - \text{full width at half maximum})/180° \qquad (1)$$

A degree of orientation of 0 means being fully non-oriented. A degree of orientation of 1 means being fully oriented.

The degree of orientation of the CNTs in the CNT assembled wire can be evaluated by not only the above-described method but also a polarized Raman analysis or a small-angle X-ray scattering method.

In the carbon nanotube assembled wire in accordance with the present embodiment, the plurality of carbon nanotubes are oriented at a degree of orientation of 0.9 or more and 1.0 or less. This means that the CNT assembled wire of the present embodiment has the plurality of CNTs highly oriented. Thus, the CNT assembled wire in accordance with the present embodiment can be elongated while maintaining the characteristics of the CNTs in electrical conductivity and breaking strength.

When the degree of orientation of the CNTs in the CNT assembled wire is less than 0.9, the electrical conductivity and the breaking strength tends to be reduced. The lower limit value for the degree of orientation is preferably 0.93, more preferably 0.94, and still more preferably 0.95. The upper limit value for the degree of orientation is preferably 0.99, and more preferably 1. The degree of orientation of the CNTs in the CNT assembled wire can be 0.93 or more and 0.99 or less, 0.94 or more and 0.99 or less, 0.95 or more and 0.99 or less, 0.93 or more and 1 or less, 0.94 or more and 1 or less, or 0.95 or more and 1 or less.

(Shape of Carbon Nanotube Assembled Wire)

The carbon nanotube assembled wire has the shape of a yarn in which the plurality of carbon nanotubes are oriented and assembled together in their longitudinal direction.

The length of the carbon nanotube assembled wire is not particularly limited, and can be adjusted as appropriate depending on the application. The length of the CNT assembled wire is preferably 100 μm or more, more preferably 1000 μm or more, and further preferably 10 cm or more, for example. Although the upper limit value for the length of the CNT assembled wire is not particularly limited, it is preferably 1 m or less from the viewpoint of manufacturing. The length of the CNT assembled wire can be measured through observation with a scanning electron microscope, an optical microscope, or visual observation.

The size of the diameter of the carbon nanotube assembled wire is not particularly limited, and can be adjusted as appropriate depending on the application. The diameter of the CNT assembled wire is preferably 0.1 μm or more, and further preferably 1 μm or more, for example. Although the upper limit value for the diameter of the CNT assembled wire is not particularly limited, it is preferably 100 μm or less from the viewpoint of manufacturing. In the present embodiment, the size of the diameter of the CNT assembled wire is smaller than the length of the CNT assembled wire. That is, the direction of the length of the CNT assembled wire corresponds to the longitudinal direction.

In the present specification, the diameter of the carbon nanotube assembled wire means an average outer diameter of a single CNT assembled wire. The average outer diameter of a single CNT assembled wire is obtained by observing cross sections at two arbitrary positions of the single CNT assembled wire with a transmission electron microscope or a scanning electron microscope, measuring, in each cross section, an outer diameter, which is the distance between farthest two points on the outer circumference of the CNT assembled wire, and calculating an average value of the obtained outer diameters.

(Elements Originating from Catalyst)

The carbon nanotube assembled wire can include at least one metal element selected from a group consisting of iron, nickel, cobalt, molybdenum, gold, silver, copper, yttrium, chromium, palladium, platinum, and tungsten. The metal element is preferably dispersed in the longitudinal direction of the carbon nanotube assembled wire. Herein, the metal element dispersed in the CNT assembled wire in the longitudinal direction thereof means that the metal element is not localized in the CNT assembled wire in the longitudinal direction thereof.

These metal elements originate from a catalyst (ferrocene $(Fe(C_5H_5)_2)$, nickelocene $(Ni(C_5H_5)_2)$, cobaltocene $(Co(C_5H_5)_2)$, or the like) used in manufacturing the CNT assembled wire. When these metal elements are dispersed and present in the CNT assembled wire in the longitudinal direction thereof, the metal elements do not affect the CNT's characteristics in electrical conductivity, and the CNT assembled wire can be elongated while maintaining the electrical conductivity that the CNT assembled wire intrinsically has.

What type of metal element is included in the CNT assembled wire and how much the former is contained in the latter can be confirmed and measured through energy dispersive X-ray spectrometry (EDX). A total content of the metal elements in the CNT assembled wire is preferably 0.1% or more and 50% or less, more preferably 1% or more and 40% or less, and still more preferably 5% or more and 20% or less based on atomicity.

The fact that the metal element is dispersed in the CNT assembled wire in the longitudinal direction thereof can be confirmed through EDX, electron energy loss spectrometry (EELS) or the like, which can perform measurement at the same time as an electron microscope such as SEM and TEM.

The carbon nanotube assembled wire can include an element of sulfur. The element of sulfur is preferably dispersed in the carbon nanotube assembled wire in the longitudinal direction thereof. Herein, the element of sulfur dispersed in the CNT assembled wire in the longitudinal direction thereof means that the element of sulfur is not localized in the CNT assembled wire in the longitudinal direction thereof.

The element of sulfur originates from an assistive catalyst $(CS_2)$ used in manufacturing the CNT assembled wire. When the element of sulfur is dispersed and present in the CNT assembled wire in the longitudinal direction thereof, the element of sulfur does not affect the CNT's characteristics in electrical conductivity and breaking strength, and the CNT assembled wire can be elongated while maintaining these characteristics.

The fact that the CNT assembled wire includes the element of sulfur, and the content of the element of sulfur in the CNT assembled wire can be confirmed and measured through EDX, thermogravimetry, and X-ray photoelectron spectroscopy. The content of the element of sulfur in the CNT assembled wire is preferably 0.1% or more and 20% or less, more preferably 1% or more and 15% or less, and still more preferably 2% or more and 10% or less based on atomicity.

The fact that the element of sulfur is dispersed in the CNT assembled wire in the longitudinal direction thereof can be confirmed by EDX, EELS or the like, which can perform measurement at the same time as an electron microscope such as SEM and TEM.

<Resin>

In the CNT-resin composite, a resin is present between a plurality of CNT assembled wires. This leads to improved breaking strength of the CNT-resin composite.

As the resin, any of a thermosetting resin, a photo-curable resin, and a thermoplastic resin can be used.

Examples of the thermosetting resin include a novolac type epoxy resin, a phenol resin, a melamine resin, an urea resin, a polyimide, an unsaturated polyester resin, a silicone resin, and a polyurethane. Among them, the novolac type epoxy resin is preferable due to the following reason: since the novolac type epoxy resin has a benzene skeleton with high affinity to the CNT surface and forms a network structure with high cross-linking density, a firm composite material can be obtained.

As the photo-curable resin, for example, an ultraviolet curable resin such as urethane acrylate can be used.

Examples of the thermoplastic resin include a polymethylmethacrylate resin, polyethylene, polypropylene, polyvinyl chloride, polystyrene, polyurethane, polyamide, polyacetal, polycarbonate, and polyester. Among them, the polymethylmethacrylate resin is preferable because the polymethylmethacrylate resin can be composited without introducing defects into CNTs and is excellent in molding workability.

The type of the resin of the CNT-resin composite can be specified by infrared spectroscopy, Raman spectroscopy, or differential scanning calorimetry.

The CNT-resin composite preferably includes 0.1% by mass or more and less than 100% by mass of the resin. This leads to further improved breaking strength of the carbon nanotube-resin composite.

The content of the resin in the CNT-resin composite is preferably 0.1% by mass or more and less than 100% by mass, and more preferably 1% by mass or more and 80% by mass or less.

The content of the resin in the CNT-resin composite can be measured by thermogravimetric analysis.

(D/G Ratio of Carbon Nanotube-Resin Composite)

In the Raman spectrum of the CNT-resin composite, a ratio D/G of a peak intensity G at a Raman shift of $1590\pm20$ cm$^{-1}$ and a peak intensity D at a Raman shift of $1350\pm20$ cm$^{-1}$ is preferably 0 or more and 0.1 or less.

The G band is a peak originating in the CNT seen in the vicinity of a Raman shift of 1590 cm$^{-1}$ in a Raman spectrum obtained through Raman spectroscopy. The D band is a peak originating in amorphous carbon or a defect in graphite or the CNT seen in the vicinity of a Raman shift of 1350 cm$^{-1}$ in the Raman spectrum obtained through Raman spectroscopy. Therefore, it is indicated that as the D/G ratio has a smaller value, the carbon nanotube has a higher crystallinity and the carbon nanotube contains a smaller amount of amorphous carbon or graphite having defects.

When the D/G ratio of the CNT-resin composite is 0.1 or less, an amount of the amorphous carbon or graphite having defects is small, and hence crystallinity is high. Thus, the CNT-resin composite can have high tensile strength and high electrical conductivity. If the D/G ratio of the CNT-resin composite exceeds 0.1, the CNT may be unable to have sufficient tensile strength and high electrical conductivity. The D/G ratio is preferably 0.1 or less, and more preferably 0.01 or less. Although the lower limit value for the D/G ratio is not particularly limited, it can be 0 or more, for example. The D/G ratio of the CNT-resin composite can be 0 or more and 0.01 or less or 0 or more and 0.1 or less.

In the present specification, the D/G ratio of the CNT-resin composite is a value measured by the following method.

The CNT-resin composite is subjected to a Raman spectroscopic analysis under the below-described condition, thereby obtaining a Raman spectrum (hereinafter, also referred to as "Raman spectrum of the CNT-resin composite"). The D/G ratio is calculated in accordance with the peak intensity of the G band and the peak intensity of the D band in the Raman spectrum of the CNT-resin composite.

Measurement Conditions for Raman Spectroscopic Analysis
Wavelength: 532 nm
Laser power: 17 mW
Exposure time: one second
Average number of times: three times
Magnification of objective lens: 50 times Second Embodiment: Method for Manufacturing Carbon Nanotube-Resin Composite The CNT-resin composite of the first embodiment can be produced by, for example, a carbon nanotube-resin composite manufacturing apparatus (hereinafter, also referred to as "CNT-resin composite manufacturing apparatus") 500 shown in FIG. 3. Carbon nanotube-resin composite manufacturing apparatus 500 can include: a carbon nanotube growing unit (hereinafter also referred to as "CNT growing unit") 21 having a tubular shape; a gas supplying unit 22 that supplies a carbon-containing gas into CNT growing unit 21 via one end (right end in FIG. 3) of CNT growing unit 21; a catalyst supplying unit 23 that supplies catalyst particles P into CNT growing unit 21; a carbon nanotube assembling unit 24 (hereinafter, also referred to as a CNT assembling unit) that is disposed on the other end side (left end in FIG. 3) of CNT growing unit 21 and that orients and assembles, in a direction along a flow of the carbon-containing gas, a plurality of carbon nanotubes obtained in CNT growing unit 21; and a carbon nanotube-resin composite forming unit 50 located on the downstream side with respect to carbon nanotube assembling unit 24. Carbon nanotube-resin composite forming unit 50 can include: a liquid adhering apparatus 51 that adheres a volatile liquid 53 to the CNT assembled wires obtained in CNT assembling unit 24; and a reeling apparatus 52 that reels the plurality of carbon nanotube assembled wires with the carbon nanotube assembled wires passing through a constriction 55 while applying tension to the carbon nanotube assembled wires and with the carbon nanotube assembled wires being then oriented and bundled in a direction along the longitudinal direction thereof.

A method for manufacturing the CNT-resin composite can include: a growing step of growing a plurality of carbon nanotubes by growing one or more carbon nanotubes from each of a plurality of catalyst particles in a suspended state by supplying a carbon-containing gas to the plurality of catalyst particles; a drawing step of drawing the plurality of carbon nanotubes by applying a tensile force to the plurality of carbon nanotubes in the suspended state; an assembling step of orienting and assembling the plurality of carbon nanotubes in the suspended state in a direction along a flow of the carbon-containing gas to obtain a plurality of carbon nanotube assembled wires; adhering a volatile liquid including a resin to the carbon nanotube assembled wires while orienting and bundling the plurality of carbon nanotube assembled wires in a direction along a longitudinal direction of each of the carbon nanotube assembled wires; and an evaporating step of evaporating the volatile liquid adhered to the plurality of carbon nanotube assembled wires to obtain the carbon nanotube-resin composite.

<Growing Step>

First, by supplying the carbon-containing gas to the plurality of catalyst particles in the suspended state, one or more carbon nanotubes are grown from each of the plurality of catalyst particles.

The growing step is performed inside CNT growing unit 21. The growing step is preferably performed at a temperature of 800° C. or more and 1200° C. or less. If the temperature is less than 800° C., CNTs tend to be grown at a slower rate. On the other hand, when the temperature exceeds 1200° C., the content of impurity carbon tends to increase. The growing step is performed under a condition in temperature of more preferably 900° C. or more and 1150° C. or less, and still more preferably 950° C. or more and 1050° C. or less.

By wind pressure of the carbon-containing gas supplied from gas supplying unit 22 to catalyst supplying unit 23 and CNT growing unit 21, a catalyst 27 disposed inside catalyst supplying unit 23 is disintegrated and thus becomes catalyst particles P, and catalyst particles P are supplied into CNT growing unit 21.

Examples of catalyst particles P include iron, nickel, cobalt, molybdenum, gold, silver, copper, palladium, and platinum. Inter alia, iron is preferably used from the viewpoint of mass production of elongate CNTs.

The carbon-containing gas is supplied from gas supplying unit 22 to CNT growing unit 21 via catalyst supplying unit 23. As the carbon-containing gas, a reducing gas such as hydrocarbon gas is used. As such a carbon-containing gas, for example, a gaseous mixture of methane and argon, a gaseous mixture of ethylene and argon, a gaseous mixture of ethanol and argon, or the like can be used. The carbon-containing gas preferably includes carbon disulfide ($CS_2$) as an assistive catalyst.

The lower limit for the average flow velocity in the CNT growing unit of the carbon-containing gas supplied from gas supplying unit 22 is 0.05 cm/sec, preferably 0.10 cm/sec, and more preferably 0.20 cm/sec. On the other hand, the upper limit for the average flow velocity in CNT growing unit 21 is preferably 10.0 cm/sec, more preferably 5.0 cm/sec. If the average flow velocity of the carbon-containing gas in CNT growing unit 21 is less than the lower limit, a carbon source gas supplied to catalyst particles P is insufficiently supplied, and carbon nanotubes formed between catalyst particles P tend to grow stagnantly. On the contrary, if the average flow velocity of the carbon-containing gas in CNT growing unit 21 exceeds the upper limit, this tends to detach carbon nanotubes from catalyst particles P, which stops growth of the carbon nanotubes and consequently inhibits formation of carbon nanotubes.

The lower limit of the Reynolds number of the flow in CNT growing unit 21 of the carbon-containing gas supplied from gas supplying unit 22 is preferably 0.01, and more preferably 0.05. On the other hand, the upper limit for the Reynolds number is 1000, preferably 100, and more preferably 10. If the Reynolds number is less than the lower limit, the apparatus is excessively restricted in design, which may make carbon nanotube-resin composite manufacturing apparatus 20 unnecessarily expensive and tends to unnecessarily lower efficiency of manufacturing carbon nanotubes. A Reynolds number exceeding the upper limit tends to disturb flow of the carbon-containing gas and inhibit production of carbon nanotubes between catalyst particles P.

The length of the CNT obtained through the growing step is preferably 0.1 μm or more and 20 μm or less. If the length of the CNT obtained through the growing step is less than 0.1 μm, adjacent CNTs would not be oriented in the longitudinal direction and instead entangled, and tend to form secondary particles. On the other hand, when the length of the CNT exceeds 20 μm, a period of time before the drawing step is performed is increased, which tends to unnecessarily decrease efficiency of manufacturing the carbon nanotube. The length of the CNT obtained through the growing step is more preferably 0.5 μm or more and 15 μm or less, and still more preferably 1 μm or more and 10 μm or less. The length of the CNT can be measured through observation with a scanning electron microscope.

<Drawing Step>

Subsequently, a tensile force is applied to the plurality of carbon nanotubes in the suspended state that are produced in the CNT growing unit to draw the plurality of carbon nanotubes.

The drawing step is performed inside CNT growing unit 21 and CNT assembling unit 24, or inside CNT assembling unit 24. When the drawing step is performed inside CNT growing unit 21, the drawing step is preferably performed in CNT growing unit 21 on a downstream side of the carbon-containing gas, that is, on a side closer to the CNT assembling unit.

The tensile force is preferably applied to the plurality of carbon nanotubes by varying the carbon-containing gas in flow velocity. For example, by making an average flow velocity of the carbon-containing gas on the downstream side larger than that of the carbon-containing gas on the upstream side, a tensile force can be applied to the CNT in a direction toward the downstream side. When a tensile force acts on an end of the carbon nanotube, the carbon nanotube is pulled while extending from catalyst particle P, and thus drawn in the longitudinal direction while it is plastically deformed and reduced in diameter.

In the drawing step, the plurality of carbon nanotubes are preferably oriented in a direction along the flow of the carbon-containing gas and thus drawn. According to this, it is believed that the carbon nanotube is not easily bent, and a linear carbon nanotube having tube portion T consisting only of a six-membered ring of carbon can be obtained. The carbon nanotube consisting only of a six-membered ring of carbon is resistant to deterioration and can thus maintain quality.

The carbon-containing gas on the downstream side preferably has an average flow velocity of 0.051 cm/sec or more and 10.001 cm/sec or less, and more preferably 0.201 cm/sec or more and 5.001 cm/sec or less. When the carbon-containing gas on the downstream side has an average flow velocity of less than 0.051 cm/sec, the carbon nanotube tends to be drawn insufficiently faster than it is grown. On the contrary, if the carbon-containing gas on the downstream side has an average flow velocity exceeding 10.001 cm/sec, this tends to detach carbon nanotubes from catalyst particles P, which stops growth of the carbon nanotubes and consequently inhibits formation of carbon nanotubes.

The carbon-containing gas on the upstream side preferably has an average flow velocity of 0.050 cm/sec or more and 10.000 cm/sec or less, and more preferably 0.200 cm/sec or more and 5.000 cm/sec or less. If the carbon-containing gas on the upstream side has an average flow velocity of less than 0.050 cm/sec, insufficient wind pressure is provided, and carbon nanotubes formed between catalyst particles P tend to grow stagnantly. On the contrary, if the carbon-containing gas on the upstream side has an average flow velocity exceeding 10.000 cm/sec, this tends to detach carbon nanotubes from catalyst particles P, which stops growth of the carbon nanotubes and consequently inhibits formation of carbon nanotubes.

As a method for making the average flow velocity of the carbon-containing gas on the downstream side larger than the average flow velocity of the carbon-containing gas on the upstream side, for example, a hollow portion which passes the carbon-containing gas is formed to have a cross section smaller in area on the downstream side of the carbon-containing gas than the upstream side of the carbon-containing gas. More specifically, a hollow portion in the CNT assembling unit (corresponding to the downstream side) passing the carbon-containing gas may have a cross section smaller in area than a hollow portion in the CNT growing unit (corresponding to the upstream side) passing the carbon-containing gas. This generates an acceleration field in the vicinity of a region in which the hollow portion has a cross section reduced in area, and provides the carbon-containing gas with a faster flow velocity.

While the carbon nanotube is drawn by tensile force, the carbon nanotube is grown on particle P while having its initial diameter. Thus, the carbon nanotube produced through the drawing step can include a tube portion T having a tubular shape and cone portions C each having a conical shape and expanding continuously in diameter from ends of the tube portion, as shown in FIG. 2.

That is, in the drawing step, a carbon nanotube formed through vapor deposition is stretched by tensile force simultaneously with the formation thereof to thereby convert some hexagonal cells of the carbon nanotube into pentagonal cells to form the conical cone portion, and convert the pentagonal cells again into hexagonal cells to form the tube portion which is a carbon nanotube with a smaller diameter.

In the drawing step, a carbon nanotube grown on catalyst particle P is grown while being stretched by using tensile force, and the tube portion can be formed at an extremely larger rate than the carbon nanotube is grown on catalyst particle P. Thus, a long carbon nanotube can be formed in a relatively short period of time. Thus, a sufficiently long carbon nanotube can be formed even if a condition allowing the carbon nanotube to be continuously grown on catalyst particle P can only be maintained for a short period of time.

It is believed that in the drawing step, causing a tensile force to act on a carbon nanotube on catalyst particle P promotes incorporation of carbon atoms at a growth point of the carbon nanotube. Thus, it is believed that the carbon nanotube can be grown further faster and hence increased in length further faster.

It is believed that, in the drawing step, by causing tensile force to act on a carbon nanotube on catalyst particle P, the carbon nanotube is less likely to be curved, and thus a linear carbon nanotube composed of a cylindrical body formed of a sheet with tube portion T consisting only of a six-membered ring of carbon can be obtained. The carbon nanotube consisting only of a six-membered ring of carbon is resistant to deterioration and can thus maintain quality.

The length of the CNT obtained through the drawing step is preferably 10 µm or more, and further preferably 100 µm or more. In particular, when the length of the carbon nanotube is 100 µm or more, such a length is suitable from the viewpoint of producing the CNT assembled wire. Although the upper limit value for the length of the carbon nanotube is not particularly limited, it is preferably 600 mm or less from the viewpoint of manufacturing. The length of the CNT can be measured through observation with a scanning electron microscope.

<Assembling Step>

Subsequently, the plurality of carbon nanotubes in the suspended state are oriented and assembled together in the direction along the flow of the carbon-containing gas to obtain the plurality of carbon nanotube assembled wires. The assembling step is performed inside CNT assembling unit 24.

As a method for orienting and assembling the plurality of CNTs in the suspended state in the direction along the flow of the carbon-containing gas, causing the plurality of carbon nanotubes to approach one another while they are oriented is considered. For example, a hollow portion in the CNT assembling unit passing the carbon-containing gas may have a cross section smaller in area than a hollow portion in the CNT growing and drawing units passing the carbon-containing gas. More specifically, the CNT assembling unit may have a honeycomb structure, and the honeycomb structure may have through holes arranged to have a longitudinal direction along the flow of the carbon-containing gas.

Figure 3:
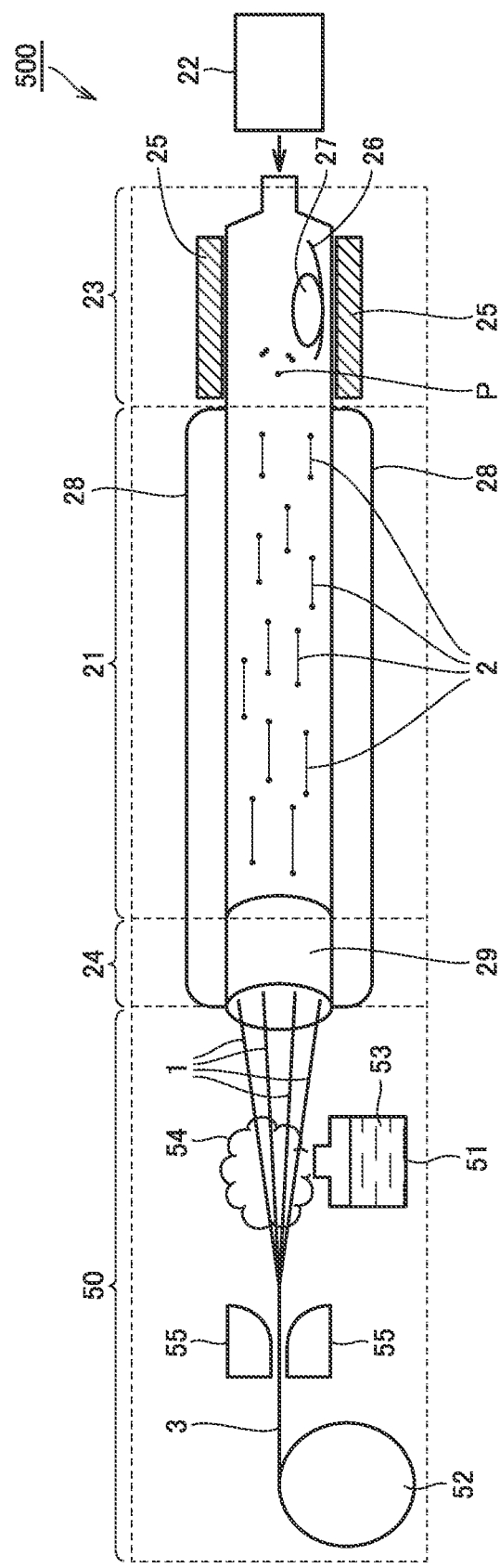
FIG. 3 is a diagram illustrating a representative exemplary configuration of a carbon nanotube-resin composite manufacturing apparatus according to one embodiment of the present disclosure.

In the present specification, the honeycomb structure means a porous body having a large number of narrow tubular through holes, as shown in FIG. 3 by a honeycomb structure 29.

When the CNT assembling unit is formed of a honeycomb structure, each through hole preferably has an area in cross section of 0.05 mm$^2$ or more and 100 mm$^2$ or less, more preferably 0.1 mm$^2$ or more and 50 mm$^2$ or less, and still more preferably 0.5 mm$^2$ or more and 10 mm$^2$ or less. When each through hole has an area in cross section of less than 0.05 mm$^2$, CNTs tend to clog inside the through hole. On the other hand, when each through hole has an area in cross section exceeding 100 mm$^2$, CNTs insufficiently approach one another, and tend to be unable to form an assembly.

When the CNT assembling unit is formed of a honeycomb structure, the honeycomb structure, as seen in a direction along the through hole (i.e., the longitudinal direction), preferably has a length of 1 mm or more and 1 m or less, more preferably 10 mm or more and 50 cm or less, and still more preferably 15 mm or more and 10 cm or less. When the honeycomb structure has a length of less than 1 mm in the direction along the through hole, the CNTs suspended in a vapor phase are insufficiently accelerated and a growth promoting effect tends to be suppressed. On the other hand, when the honeycomb structure has a length exceeding 1 m in the direction along the through hole, an amount of CNTs deposited on the internal wall of the through hole is increased, and it tends to be difficult to collect the CNTs.

The carbon-containing gas in the CNT assembling unit preferably has an average flow velocity of 0.05 cm/sec or more and 10 cm/sec or less, and more preferably 0.2 cm/sec or more and 5 cm/sec or less. When the average flow velocity of the carbon-containing gas is less than 0.05 cm/sec, a thin-film non-oriented CNT tends to be obtained. On the other hand, when the average flow velocity of the carbon-containing gas exceeds 10 cm/sec, the carbon-containing gas tends to arrive at the CNT assembling unit in an unreacted state and cause an incomplete decomposition reaction, resulting in adhesion of tar.

While in the above description the drawing step is followed by the assembling step, the drawing step and the assembling step may be performed simultaneously. Furthermore, the drawing step may be followed by an additional drawing step and an assembling step performed simultaneously. For example, when the honeycomb structure is used as the CNT assembling unit, drawing CNTs and assembling the CNTs are simultaneously performed in the through holes of the honeycomb structure.

In accordance with the above-described manufacturing method, by continuously supplying the carbon-containing gas to the catalyst supplying unit, the CNT growing unit, and the CNT assembling unit, the CNT assembled wire can be continuously manufactured without limitation on length. The CNT assembled wire can be adjusted in length, as appropriate, by adjusting the flow rate of the carbon-containing gas, how long in time it is supplied, and the like.

The length of the CNT assembled wire obtained through the assembling step is preferably 100 µm or more, more preferably 1000 µm or more, and further preferably 10000 µm or more. Although the upper limit value for the length of the CNT assembled wire is not particularly limited, it is preferably 1 m or less from the viewpoint of manufacturing. The length of the CNT assembled wire can be measured through observation with an optical microscope or visual observation.

<Adhering Step>

Next, the volatile liquid including the resin is adhered to the carbon nanotube assembled wires while orienting and bundling the plurality of carbon nanotube assembled wires obtained in the assembling step in the direction along the longitudinal direction of each of the carbon nanotube assembled wires.

As a method for orienting and bundling the plurality of CNT assembled wires in the direction along the longitudinal direction of each of the CNT assembled wires, the following method can be employed: the plurality of CNT assembled wires are caused to pass through constriction 55 and then are reeled while applying a tension using reeling apparatus 52.

As a method for adhering the volatile liquid including the resin to the carbon nanotube assembled wire, for example, the following method can be employed: the volatile liquid is atomized into vapor 55 and vapor 55 is sprayed onto the carbon nanotube assembled wire.

Examples of the volatile liquid include methanol, ethanol, isopropyl alcohol, acetone, methyl ethyl ketone, xylene, anisole, toluene, cresol, pyrrolidone, carbitol, carbitol acetate, water, epoxy monomer, and acrylic monomer. Ethanol, acetone, toluene, xylene, or anisole can be used.

In FIG. 3, the adhering step is performed before the plurality of carbon nanotube assembled wires are oriented and bundled in the direction along the longitudinal direction of each of the carbon nanotube assembled wires (that is, the adhering step is performed on the upstream side with respect to constriction 55); however, it is not limited thereto. The adhering step can be performed after the plurality of carbon nanotube assembled wires are orientated and bundled in the direction along the longitudinal direction of each of the plurality of carbon nanotube assembled wires (that is, the adhering step can be performed on the downstream side with respect to constriction 55).

The volatile liquid includes the resin. As the resin, the resin described in the first embodiment can be used.

The content of the resin in the volatile liquid is preferably 0.1% by mass or more and 20% by mass or less, and more preferably 1% by mass or more and 10% by mass or less.

<Evaporating Step>

Next, the volatile liquid adhered to the plurality of carbon nanotube assembled wires in the adhering step is evaporated to obtain carbon nanotube-resin composite 3.

The evaporating step can be performed by natural drying.

Additional Note 1

In the carbon nanotube-resin composite of the present disclosure, the length of the carbon nanotube is preferably 10 μm or more and 600 mm or less. The length of the carbon nanotube is preferably 100 μm or more and 600 mm or less.

Additional Note 2

In the carbon nanotube-resin composite of the present disclosure, the diameter of the carbon nanotube is preferably 0.6 nm or more and 20 nm or less. The diameter of the carbon nanotube is preferably 1 nm or more and 10 nm or less.

The diameter of the carbon nanotube is preferably 1 nm or more and 2 nm or less.

Additional Note 3

In the CNT assembled wire of the carbon nanotube-resin composite of the present disclosure, the carbon nanotubes are preferably oriented at a degree of orientation of 0.93 or more and 0.99 or less.

The degree of orientation is preferably 0.94 or more and 0.99 or less.

The degree of orientation is preferably 0.95 or more and 0.99 or less.

The degree of orientation is preferably 0.93 or more and 1 or less.

The degree of orientation is preferably 0.94 or more and 1 or less.

The degree of orientation is preferably 0.95 or more and 1 or less.

Additional Note 4

In the CNT assembly of the carbon nanotube-resin composite of the present disclosure, the carbon nanotube assembled wire includes an element of sulfur, and the content of the element of sulfur in the carbon nanotube assembled wire is preferably 0.1% or more and 20% or less based on atomicity.

The content of the element of sulfur in the carbon nanotube assembled wire is preferably 1% or more and 15% or less.

The content of the element of sulfur in the carbon nanotube assembled wire is preferably 2% or more and 10% or less.

Additional Note 5

The content of the resin in the CNT assembled wire of the carbon nanotube-resin composite of the present disclosure is preferably 1% by mass or more and 80% by mass or less.

Additional Note 6

In the Raman spectrum of the carbon nanotube-resin composite of the present disclosure, ratio D/G of peak intensity G at a Raman shift of $1590 \pm 20$ cm$^{-1}$ and peak intensity D at a Raman shift of $1350 \pm 20$ cm$^{-1}$ is preferably 0 or more and 0.01 or less.

EXAMPLES

The following describes the present embodiment more specifically by way of examples. However, the present embodiment is not limited by these examples.

Samples 1 and 2

<Preparing Carbon Nanotube-Resin Composite Manufacturing Apparatus>

A carbon nanotube-resin composite manufacturing apparatus having a configuration similar to that of the carbon nanotube-resin composite manufacturing apparatus shown in FIG. 3 was prepared. Specifically, carbon nanotube growing unit 21 and carbon nanotube assembling unit 24 are disposed in an electric furnace 28. The CNT growing unit is a quartz tube having an inner diameter of 20 mm and a length of 800 mm. As carbon nanotube assembling unit 24, a ceramic honeycomb structure is disposed in a quartz tube in communication with the CNT growing unit. The honeycomb structure has about 200 through holes per inch, and each through hole has an area in cross section of 0.8 mm$^2$.

Catalyst supplying unit 23 is disposed on a side of CNT growing unit 21 opposite to a side thereof in communication with CNT assembling unit 24. Catalyst supplying unit 23 is a quartz tube having an inner diameter of 20 mm and a length of 200 mm, and is disposed in communication with the CNT growing unit. In catalyst supplying unit 23, ferrocene is disposed as a catalyst on catalyst holder 26. Catalyst supplying unit 23 is heated by heater 25.

Gas supplying unit 22 is disposed on a side of catalyst supplying unit 23 opposite to a side thereof connected to CNT growing unit 21.

Liquid adhering apparatus 51 and reeling apparatus 52 are disposed on the downstream side with respect to CNT assembling unit 24, liquid adhering apparatus 51 being an apparatus that adheres volatile liquid 53 including the resin to the CNT assembled wires obtained in CNT assembling unit 24, reeling apparatus 52 being an apparatus that orients, bundles and reels the plurality of carbon nanotube assembled wires in the direction along the longitudinal direction of each of the carbon nanotube assembled wires while applying a tension to the carbon nanotube assembled wires.

The liquid adhering apparatus is disposed on the upstream side with respect to constriction 55.

<Producing Carbon Nanotube-Resin Composite>

Initially, in a sample 1, the electric furnace's internal temperature was raised to 1000° C. while argon gas having an argon gas concentration of 100% by volume was supplied from the gas supplying unit into the CNT growing unit at a flow rate of 1000 cc/min (flow velocity: 3.4 cm/sec) for 50 minutes. Subsequently, in addition to the argon gas, methane gas was supplied at a flow rate of 50 cc/min (flow velocity: 0.17 cm/sec) and carbon disulfide ($CS_2$) gas was supplied at a flow rate of 1 cc/min (flow velocity: 0.003 cm/sec) for 120 minutes. A gaseous mixture including the argon gas, the methane gas, and the carbon disulfide (i.e., the carbon-containing gas) as a whole has a flow velocity of 3.6 cm/sec.

By thus supplying the argon gas, the methane gas and the carbon disulfide gas, a catalyst is disintegrated, and catalyst particles were thus discharged into the CNT growing unit. Thereafter, CNTs were grown in the CNT growing unit.

Thereafter, CNTs were drawn and assembled together in the CNT assembling unit and a CNT assembled wire was thus obtained. While reeling the plurality of obtained CNT assembled wires by the reeling apparatus, the volatile liquid was adhered to the CNT assembled wires, and then the volatile liquid was evaporated, thereby obtaining the CNT-resin composite of sample 1. It should be noted that the volatile liquid used in sample 1 includes 1% by mass of a novolac resin. Sample 1 corresponds to an example of the present disclosure.

In a sample 2, a CNT-resin composite was produced under the same conditions as in sample 1 except that the volatile liquid included 4% by mass of a polymethylmethacrylate resin instead of the novolac resin. Sample 2 corresponds to an example of the present disclosure.

Sample 3

As a sample 3, a CNT assembled wire bundle was prepared by reeling and bundling, by the reeling apparatus, the plurality of CNT assembled wires obtained in the CNT assembling unit of apparatus 1. The CNT assembled wire bundle includes no resin. Sample 3 corresponds to a comparative example.

<Measuring Carbon Nanotube Assembled Wire>
(Degree of Orientation)

The degree of orientation of the CNTs was measured in each of the CNT-resin composites of samples 1 and 2 and the CNT assembled wire bundle of sample 3. The method for calculating the degree of orientation is the same as the method described in the first embodiment, and accordingly, it will not be described repeatedly.

The degree of orientation was 0.9 or more and 1 or less in each of samples 1 to 3.

(D/G Ratio)

The D/G ratios of the CNT-resin composites of samples 1 and 2 and the CNT assembled wire bundle of sample 3 were measured. Since the method for measuring the D/G ratio is the same as the method described in the first embodiment, the method for measuring the D/G ratio will not be described repeatedly.

In each of samples 1 to 3, the D/G ratio was 0 or more and 0.1 or less.

(Resin Content)

The resin contents of the CNT-resin composites of samples 1 and 2 and the CNT assembled wire bundle of sample 3 were measured.

The resin content of sample 1 was 10% by mass. The resin content of sample 2 was 20% by mass. The resin content of sample 3 was 0%.

(Breaking Strength)

The stress-strain curves of the CNT-resin composites of samples 1 and 2 and the CNT assembled wire bundle of sample 3 were measured. A method for measuring the stress-strain curve is as follows.

Figure 4:
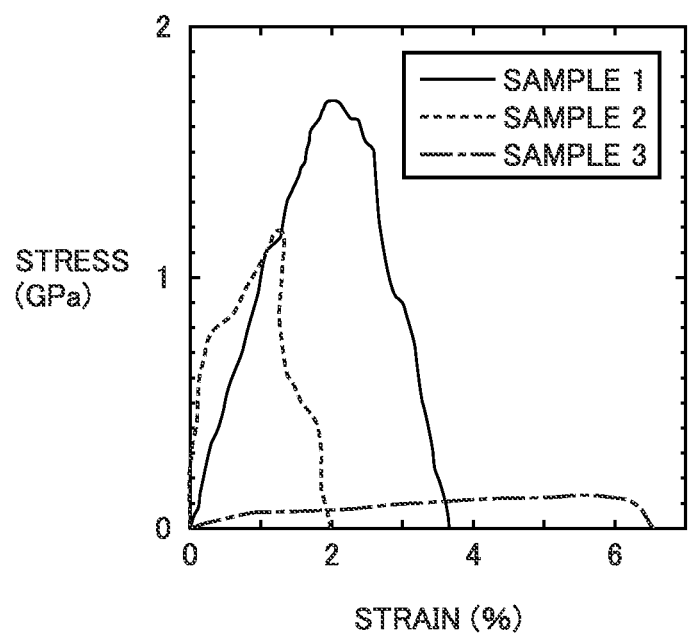
FIG. 4 is a diagram showing stress-strain curves of samples 1 to 3.

A CNT assembled wire having a length of about 3 cm was prepared, and both the ends of the CNT assembled wire were fixed to a pulling jig plate using an adhesive agent. A tensile stress until the CNT assembled wire of a length of 1 cm in its portion not fixed by the adhesive agent was broken was measured using a load cell (measurement instrument: "ZTS-5N" manufactured by IMADA Co., Ltd.). The obtained stress-strain curves are shown in FIG. 4. In each of the stress-strain curves, it is indicated that as the stress (vertical axis) is larger, the breaking strength is larger, and it is indicated that as the strain (horizontal axis) is larger, elongation is larger.

It was confirmed that the breaking strength of sample 1 was improved by 15 times or more as compared with sample 3.

It was confirmed that the breaking strength of sample 2 was improved by about 10 times as compared with sample 3.

While embodiments and examples of the present disclosure have been described as above, it is also planned from the beginning that the configurations of the above-described embodiments and examples are appropriately combined and variously modified.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

REFERENCE SIGNS LIST 1, 1a, 1b, 1c, 1d carbon nanotube assembled wire, 2 carbon nanotube, 3 carbon nanotube-resin composite, 21 CNT growing unit, 22 gas supplying unit, 23 catalyst supplying unit, 24, 24a carbon nanotube assembling unit, 25 heater, 26 catalyst holder, 27 catalyst, 28 electric furnace, 29 honeycomb structure, 50 carbon nanotube-resin composite forming unit, 51 liquid adhering apparatus, 52 reeling apparatus, 53 volatile liquid, 54 vapor, 55 constriction, 500 carbon nanotube-resin composite manufacturing apparatus, T tube portion, C cone portion, P catalyst particle.

The invention claimed is:

1. A carbon nanotube-resin composite comprising:
a carbon nanotube assembled wire including a plurality of carbon nanotubes; and
a resin, wherein
the carbon nanotubes include a tube portion having a tubular shape and at least one cone portion having a conical shape that expands continuously in diameter from at least one end of the tube portion,
in the carbon nanotube assembled wire, the carbon nanotubes are oriented at a degree of orientation of 0.9 or more and 1 or less,
the carbon nanotube resin composite includes a plurality of the carbon nanotube assembled wires,
the plurality of the carbon nanotube assembled wires are oriented and bundled in a direction along a longitudinal direction of each of the plurality of carbon nanotube assembled wires, and
in the carbon nanotube resin composite, the resin is present between the plurality of the carbon nanotube assembled wires.

2. The carbon nanotube-resin composite according to claim 1, wherein the carbon nanotube-resin composite includes 0.1% by mass or more and less than 100% by mass of the resin.

3. The carbon nanotube-resin composite according to claim 1, wherein the resin is a thermosetting resin or a photo-curable resin.

4. The carbon nanotube-resin composite according to claim 3, wherein the thermosetting resin is a novolac type epoxy resin.

5. The carbon nanotube-resin composite according to claim 1, wherein the resin is a thermoplastic resin.

6. The carbon nanotube-resin composite according to claim 5, wherein the thermoplastic resin is a polymethylmethacrylate resin.

7. The carbon nanotube-resin composite according to claim 1, wherein in a Raman spectrum of the carbon nanotube-resin composite, a ratio D/G of a peak intensity G at a Raman shift of $1590\pm20$ cm$^{-1}$ and a peak intensity D at a Raman shift of $1350\pm20$ cm$^{-1}$ is 0 or more and 0.1 or less.

8. A method for manufacturing the carbon nanotube-resin composite recited in claim 1, the method comprising:
   growing a plurality of carbon nanotubes by growing one or more carbon nanotubes from each of a plurality of catalyst particles in a suspended state by supplying a carbon-containing gas to the plurality of catalyst particles;
   drawing the plurality of carbon nanotubes by applying a tensile force to the plurality of carbon nanotubes in the suspended state, thereby forming carbon nanotubes having a tube portion having a tubular shape and at least one cone portion having a conical shape that expands continuously in diameter from at least one end of the tube portion;
   orienting and assembling the plurality of carbon nanotubes in the suspended state in a direction along a flow of the carbon-containing gas to obtain a plurality of carbon nanotube assembled wires;
   adhering a volatile liquid including a resin to the plurality of carbon nanotube assembled wires while orienting and bundling the plurality of carbon nanotube assembled wires in a direction along a longitudinal direction of each of the plurality of carbon nanotube assembled wires; and
   evaporating the volatile liquid adhered to the plurality of carbon nanotube assembled wires to obtain the carbon nanotube-resin composite.

\* \* \* \* \*